United States Patent
Kim et al.

(10) Patent No.: US 8,506,149 B2
(45) Date of Patent: Aug. 13, 2013

(54) OPTICAL SHEETS

(75) Inventors: Kyung Nam Kim, Yongin-si (KR); Hyun Jung Kim, Jeju-si (KR); Sang Kyun Kim, Yongin-si (KR); Hyun Jin Kim, Yongin-si (KR); Jong Min Park, Anyang-si (KR); Chung Seock Kang, Suji-gu (KR)

(73) Assignee: Kolon Industries, Inc., Gyeonggi-do (KR)

(*) Notice: Subject to any disclaimer, the term of this patent is extended or adjusted under 35 U.S.C. 154(b) by 438 days.

(21) Appl. No.: 12/532,081

(22) PCT Filed: Mar. 19, 2008

(86) PCT No.: PCT/KR2008/001554
§ 371 (c)(1),
(2), (4) Date: Sep. 18, 2009

(87) PCT Pub. No.: WO2008/115008
PCT Pub. Date: Sep. 25, 2008

(65) Prior Publication Data
US 2010/0085735 A1    Apr. 8, 2010

(30) Foreign Application Priority Data

Mar. 20, 2007 (KR) .................. 10-2007-0027093
Aug. 28, 2007 (KR) .................. 10-2007-0086733
Sep. 20, 2007 (KR) .................. 10-2007-0095608

(51) Int. Cl.
*G09F 13/04* (2006.01)
(52) U.S. Cl.
USPC .................. 362/607; 362/330; 362/97.2

(58) Field of Classification Search
USPC ............... 362/97.2, 330, 339, 606, 607, 561, 362/97.1, 97.3, 97.4; 359/599, 619; 349/61, 349/63, 64
See application file for complete search history.

(56) References Cited

U.S. PATENT DOCUMENTS

| | | | |
|---|---|---|---|
| 5,797,668 A * | 8/1998 | Kojima et al. | 362/618 |
| 5,852,514 A * | 12/1998 | Toshima et al. | 359/599 |
| 6,343,865 B1 | 2/2002 | Suzuki | |
| 6,577,358 B1 * | 6/2003 | Arakawa et al. | 349/57 |
| 7,448,775 B2 * | 11/2008 | Parker et al. | 362/331 |
| 7,695,152 B2 * | 4/2010 | Chang | 362/97.2 |
| 7,777,831 B2 * | 8/2010 | Kim et al. | 349/62 |
| 7,806,545 B2 * | 10/2010 | Hsu et al. | 362/97.2 |
| 7,857,471 B2 * | 12/2010 | Ohta et al. | 362/19 |
| 8,007,118 B2 * | 8/2011 | O'Neill et al. | 362/19 |
| 2002/0150722 A1 | 10/2002 | Suzuki | |
| 2004/0075897 A1 | 4/2004 | Ookawa et al. | |
| 2007/0014034 A1 * | 1/2007 | Lee et al. | 359/707 |
| 2007/0171671 A1 * | 7/2007 | Kurokawa et al. | 362/606 |

FOREIGN PATENT DOCUMENTS

KR   10-2007-0015077 A   2/2007

OTHER PUBLICATIONS

International Search Report of PCT/KR2008/001554 dated May 28, 2008.

* cited by examiner

*Primary Examiner* — Bao Q Truong
(74) *Attorney, Agent, or Firm* — Sughrue Mion, PLLC

(57) ABSTRACT

Disclosed is an optical sheet for use in liquid crystal displays, which simultaneously functions to uniformly diffuse light emitted from a light guide plate and a diffusion plate and to increase brightness, decreases the loss of light, and enables the fabrication of thinner liquid crystal displays.

18 Claims, 4 Drawing Sheets

(a)

(b)

(a)

(b)

OPTICAL SHEETS

TECHNICAL FIELD

The present invention relates to an optical sheet for use in liquid crystal displays.

BACKGROUND ART

As industrial society has developed toward an advanced information age, the importance of electronic displays as a medium for displaying and transferring various pieces of information is increasing day by day. Conventionally, a CRT (Cathode Ray Tube), which is bulky, was widely used therefor, but faces considerable limitations in terms of the space required to mount it, thus making it difficult to manufacture CRTs having larger sizes. Accordingly, CRTs are being replaced with various types of flat panel displays, including liquid crystal displays (LCDs), plasma display panels (PDPs), field emission displays (FEDs), and organic electroluminescent displays. Among such flat panel displays, in particular, LCDs, a technologically intensive product resulting from a combination of liquid crystal-semiconductor techniques, are advantageous because they are thin and light and consume little power. Therefore, research and development into structures and manufacturing techniques thereof is continuing. Nowadays, LCDs, which have already been applied in fields such as notebook computers, monitors for desktop computers, and portable personal communication devices (PDAs and mobile phones), are being manufactured in larger sizes, and thus, it is possible to apply LCDs to large-sized TVs, such as HD (High-Definition) TVs. Thereby, LCDs are receiving attention as novel displays able to substitute for CRTs, which used to be synonymous for displays.

In the LCDs, because the liquid crystals themselves cannot emit light, an additional light source is provided at the back surface thereof so that the intensity of light passing through the liquid crystals in each pixel is controlled to realize contrast. More specifically, the LCD, serving as a device for adjusting light transmittance using the electrical properties of liquid crystal material, emits light from a light source lamp mounted to the back surface thereof, and the light thus emitted is passed through various functional prism films or sheets to thus cause light to be uniform and directional, after which such controlled light is also passed through a color filter, thereby realizing red, green, and blue (R, G, B) colors. Furthermore, the LCD is of an indirect light emission type, which realizes an image by controlling the contrast of each pixel through an electrical method. As such, a light-emitting device provided with a light source is regarded as important in determining the quality of the image of the LCD, including brightness and uniformity.

Such a light-emitting device is mainly exemplified by a backlight unit. A general backlight unit is illustrated in FIG. 1. Typically, a backlight unit causes light to be emitted using a light source 1 such as a cold cathode fluorescent lamp (CCFL), so that such emitted light is sequentially passed through a light guide plate 3, a diffusion sheet 4, and a prism sheet 5, thus reaching a liquid crystal panel 6. The light guide plate 3 functions to transfer light emitted from the light source in order to distribute it over the entire front surface of the liquid crystal panel 6, which is planar, and the diffusion sheet 4 realizes uniform light intensity over the entire front surface. The prism sheet 5 functions to control the light path so that light traveling in various directions through the diffusion sheet 4 is transformed within a range of viewing angles θ suitable for enabling the image to be viewed by an observer. Further, a reflection sheet 2 is provided under the light guide plate 5 to reflect light, which does not reach the liquid crystal panel 6 and is outside of the light path, so that such light is used again, thereby increasing the efficiency of use of the light source.

In this way, in order to effectively transfer such emitted light to the liquid crystal panel, a plurality of films having various functions is mounted, thereby causing light interference, including a Newton's Ring phenomenon, occurring as a result of use of the plurality of films, or a wet-out phenomenon, by which air is removed from the contact surface between the films. Further, while light is passed through the plurality of films, light is considerably lost due to scattering or absorption, and furthermore, the films may be damaged, attributable to physical contact between the films, undesirably entailing problems of low productivity and increased costs.

In the conventional prism film, in addition to a substrate layer and a prism layer constituting the prism film, there has been illustrated the case in which the other surface of the substrate layer is provided with diffusion particles. However, this case is disadvantageous because limitations are imposed on the effective diffusion of light, and light through the interface of the diffusion particles must pass through the substrate layer before reaching the prism layer, and thus, the loss of light still occurs.

DISCLOSURE

Technical Problem

Accordingly, the present invention provides an optical sheet, which includes a prism layer that can be easily formed on a light diffusion layer and exhibits various functions in the form of a single sheet, thus ensuring good visibility.

In addition, the present invention provides an optical sheet, which has brightness as high as in the conventional use of a light diffusion sheet, a prism sheet and a protective film, which are in a layered form, and realizes a wide viewing angle.

In addition, the present invention provides an optical sheet, in which a difference in refractive index between a prism layer and a binder resin of a light diffusion layer is controlled, so that the total amount of light that is reflected is decreased, thus increasing efficiency of incident light.

In addition, the present invention provides an optical sheet, in which the number of sheets to be mounted in a backlight unit is decreased.

In addition, the present invention provides an optical sheet, which includes a prism layer that can be easily formed on a light diffusion layer and prevents the loss of light due to the overlapping of particles.

In addition, the present invention provides an optical sheet, which reduces contact with an upper panel, thus preventing the loss of brightness or damage to a prism layer.

Technical Solution

According to the present invention, an optical sheet may comprise a transparent substrate layer; a light diffusion layer formed on one surface of the transparent substrate layer and containing a binder resin and light-diffusing particles, in which a difference in refractive index between the light-diffusing particles and the binder resin is 0.05 or less; and a prism layer formed on the light diffusion layer.

In the present invention, the optical sheet may comprise a damage prevention layer formed on the other surface of the transparent substrate layer and containing a binder resin and particles.

The light diffusion layer may have a cross-sectional structure in which the light-diffusing particles are dispersed in a mono layer.

The light diffusion layer may comprise 10~500 parts by weight of light-diffusing particles having a particle size of 1~50 μm based on 100 parts by weight of a solid content of the binder resin.

The light diffusion layer may comprise 10~300 parts by weight of light-diffusing particles having a particle size of 1~50 μm based on 100 parts by weight of a solid content of the binder resin.

The prism layer may have a refractive index which is 0.01~0.2 higher than the refractive index of the binder resin of the light diffusion layer.

The prism layer may be imparted with a structured surface by arranging a plurality of three-dimensional (3D) structures selected from among 3D column structures having a semicircular or semi-elliptical cross-section, 3D column structures having a triangular or a polygonal cross-section, circular cone structures, and polypyramid structures.

The prism layer may be imparted with a structured surface by arranging a plurality of 3D structures selected from among 3D column structures having a semicircular or semi-elliptical cross-section, 3D column structures having a triangular or a polygonal cross-section, circular cone structures, and polypyramid structures, and the 3D structures may comprise at least two types of 3D structures having the same width and different heights, which are arranged regularly or irregularly.

The prism layer may be imparted with a structured surface by arranging a plurality of 3D structures selected from among 3D column structures having a semicircular or semi-elliptical cross-section, 3D column structures having a triangular or a polygonal cross-section, circular cone structures, and polypyramid structures, and the 3D structures may comprise at least two types of 3D structures having different widths and the same height, which are arranged regularly or irregularly.

The prism layer may be imparted with a structured surface by arranging a plurality of 3D structures selected from among circular cone structures and polypyramid structures, and the 3D structures having the same shape and dimension may be continuously arranged to be adjacent to each other, in which imaginary lines that link peaks of the 3D structures may be in a nonlinear form when viewed from above.

The damage prevention layer may comprise particles which are the same as or different from the particles of the light diffusion layer.

In addition, a backlight unit assembly may comprise an optical sheet, including a transparent substrate layer, a light diffusion layer formed on one surface of the transparent substrate layer and containing a binder resin and light-diffusing particles, in which a difference in refractive index between the light-diffusing particles and the binder resin is 0.05 or less, and a prism layer formed on the light diffusion layer; and a light diffusion sheet disposed on an upper surface or a lower surface of the optical sheet.

In addition, a backlight unit assembly may comprise an optical sheet, including a transparent substrate layer, a light diffusion layer formed on one surface of the transparent substrate layer and containing a binder resin and light-diffusing particles, in which a difference in refractive index between the light-diffusing particles and the binder resin is 0.05 or less, and a prism layer formed on the light diffusion layer; and a prism sheet disposed on an upper surface or a lower surface of the optical sheet.

In addition, a back unit assembly may comprise an optical sheet, including a transparent substrate layer, a light diffusion layer formed on one surface of the transparent substrate layer and containing a binder resin and light-diffusing particles, in which a difference in refractive index between the light-diffusing particles and the binder resin is 0.05 or less, and a prism layer formed on the light diffusion layer; and a protective film disposed on an upper surface of the optical sheet.

Advantageous Effects

According to the present invention, an optical sheet functions to uniformly diffuse light emitted from a light guide plate or a diffusion sheet and to increase brightness at the same time, includes a prism layer which can be easily formed on a light diffusion layer, and can reduce the loss of light.

In consideration of light diffusivity and light-collecting functions, part of a conventional optical film, for example, a protective film, may be omitted, and thus, the optical sheet of the present invention can prevent light interference, the loss of light, such as scattering or absorption, and damage to a film.

Further, as the shape of the surface of the prism layer can be controlled, contact thereof with a panel can be reduced, thereby preventing brightness from being decreased due to damage to the prism layer.

BEST MODE

Figure 1:
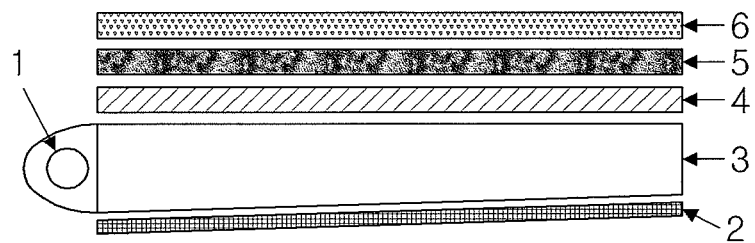
FIG. 1 is a schematic view illustrating a typical backlight unit.

According to the present invention, an optical sheet has a structure composed of a transparent substrate layer, a light diffusion layer formed on one surface of the transparent substrate layer, and a prism layer formed on the light diffusion layer.

Examples of the transparent substrate layer include a polyethyleneterephthalate film, a polycarbonate film, a polypropylene film, a polyethylene film, a polystyrene film, or a polyepoxy film. Particularly useful is a polyethyleneterephthalate film or a polycarbonate film. The thickness of the transparent substrate layer may be set in the range of 10~1000 μm. In particular, when the transparent substrate layer is 15~400 μm thick, mechanical strength, thermal stability, and flexibility are advantageous, and the loss of transmitted light may be prevented.

The light diffusion layer, which is formed on one surface of the transparent substrate layer, is formed by dispersing light-diffusing particles in a binder resin. In the present invention, the difference in refractive index between the binder resin and the light-diffusing particles is controlled to 0.05 or less, so that the internal reflections of light occurring from the difference in refractive index between two materials are reduced, thereby increasing the efficiency with which light enters the prism layer.

The binder resin includes a resin that adheres well to the transparent substrate layer and has good compatibility with light-diffusing particles dispersed therein, for example, a resin in which light-diffusing particles are uniformly dispersed so that they are not separated or precipitated. Specific examples of the resin include acrylic resin, including homopolymers, copolymers, or terpolymers of unsaturated polyester, methyl methacrylate, ethyl methacrylate, isobutyl methacrylate, n-butyl methacrylate, n-butylmethyl methacrylate, acrylic acid, methacrylic acid, hydroxyethyl methacrylate, hydroxypropyl methacrylate, hydroxyethyl acrylate, acrylamide, methylolacrylamide, glycidyl methacrylate, ethyl acrylate, isobutyl acrylate, n-butyl acrylate, and 2-ethylhexyl acrylate, urethane resin, epoxy resin, and melamine resin.

In the case where the light-diffusing particles may be used in an amount of 10~500 parts by weight, and preferably 10~300 parts by weight, based on 100 parts by weight of the binder resin, and have a particle size of 1~50 μm, the light-diffusing particles may be dispersed in the form of a mono layer in the light diffusion layer, and are suitable for realizing desired light diffusion effects, and furthermore, white turbidity and separation of the particles, which may be caused by excessive use thereof, may be prevented.

The light-diffusing particles contained in the light diffusion layer may be dispersed in the form of a mono layer or a multilayer. When such particles are dispersed in the form of a mono layer, it is easy to form the prism layer on the light diffusion layer, and the loss of light due to overlapping of the particles may be prevented.

The light-diffusing particles include organic particles or inorganic particles. Examples of the organic particles include acrylic particles, including homopolymers or copolymers of methyl methacrylate, acrylic acid, methacrylic acid, hydroxyethyl methacrylate, hydroxypropyl methacrylate, acrylamide, methylolacrylamide, glycidyl methacrylate, ethyl acrylate, isobutyl acrylate, n-butyl acrylate, and 2-ethylhexyl acrylate, olefin particles, including polyethylene, polystyrene, and polypropylene, acryl-olefin copolymer particles, and multilayer multicomponent particles prepared by forming a layer of homopolymer particles and then forming a layer of another type of monomer thereon, and examples of the inorganic particles include silicon oxide, aluminum oxide, titanium oxide, zirconium oxide, and magnesium fluoride. The above organic and inorganic particles are merely illustrative, are not limited to the examples listed above, and may be replaced with other known materials as long as the main purpose of the present invention is achieved, as will be apparent to those skilled in that art. The case in which the type of material is changed also falls within the technical scope of the present invention.

On one surface of the light diffusion layer, the prism layer is formed.

Typical examples of the material for the prism layer include polymer resin, including UV curable resin or heat curable resin. Particularly useful is a resin composition that is very transparent and is capable of forming a crosslink bond adequate for maintaining the shape of an optical structure. Examples thereof include epoxy, polyethylol, unsaturated polyester, unsaturated fatty acid ester, aromatic vinyl compounds, unsaturated fatty acids and derivatives thereof, unsaturated dibasic acids and derivatives thereof, and vinyl cyanide compounds such as methacrylonitrile. Specifically, styrene resin and (meth)acrylic acid ester resin are exemplary. Among them, the use of (meth)acrylic acid ester resin, which is very transparent, is preferable. Such resin includes oligomers, such as polyurethane (meth)acrylate, epoxy (meth)acrylate, and polyester (meth)acrylate, and may be used alone or diluted with a (meth)acrylate monomer having a polyfunctional or monofunctional group.

In the present invention, the prism layer may be given a structured surface by arranging a plurality of 3D structures selected from among 3D column structures having a semicircular or semi-elliptical cross-section, 3D column structures having a triangular or polygonal cross-section, circular cone structures, and polypyramid structures, but the present invention is not limited to such shapes.

In the case where the optical sheet of the present invention is applied to a backlight unit, it may exhibit both a diffusion function and a light-collecting function, and thus the additional use of a protective film may be omitted. In this case, however, there is a concern about damage to the structured surface of the prism layer because the prism layer is brought into contact with a panel.

Thus, in consideration thereof, the surface of the prism layer is structured by arranging the plurality of 3D structures, selected from among 3D column structures having a semicircular or semi-elliptical cross-section, 3D column structures having a triangular or polygonal cross-section, circular cone structures, and polypyramid structures, in which the 3D structures include at least two types of 3D structures having the same width and different heights, which are arranged regularly or irregularly.

In such a case, when a panel is disposed on the optical sheet, the contact surface with the upper panel is reduced, thus decreasing the probability of generation of defects due to an increase in contact surface.

Figure 2:
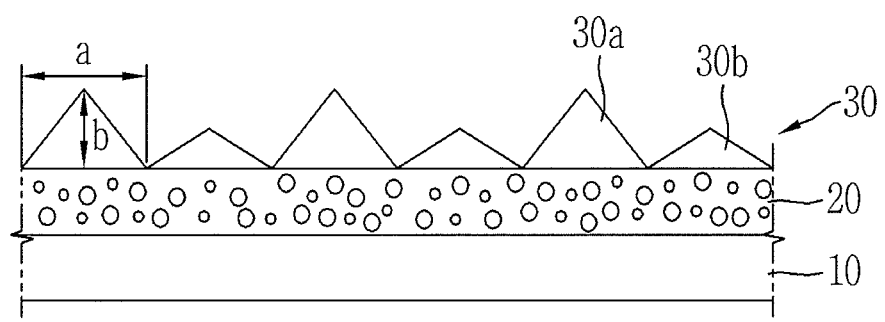
FIG. 2 is a cross-sectional view illustrating an optical sheet according to a first embodiment of the present invention.

An example thereof is illustrated in FIG. 2. FIG. 2 shows an optical sheet including a prism layer 30 according to a first embodiment, having a structured surface by arranging a plurality of 3D column structures, the cross-section of which is triangular. The prism layer 30 is composed of two types of 3D structures 30a, 30b having the same width a and different heights b, which are regularly arranged.

In this case, when a panel is disposed on the prism layer, the area of the structured surface of the prism layer coming into contact with the panel is reduced, thereby decreasing the probability of damage thereto.

In FIG. 2, only the case where the two types of 3D column structures, the cross-section of which is triangular, are regularly arranged is illustrated. However, without limitation thereto, the cross-section thereof may have a semicircular shape, a semi-elliptical shape, or a polygonal shape, and furthermore, other types having the same width and different heights may coexist, and can be regularly or irregularly arranged.

In addition, the surface structure of a prism layer according to a second embodiment for achieving the same purpose of the present invention includes an arrangement of a plurality of 3D structures selected from among 3D column structures having a semicircular or semi-elliptical cross-section, 3D column structures having a triangular or polygonal cross-section, circular cone structures, and polypyramid structures, in which the 3D structures may include at least two types of 3D structures having the same height and different widths, arranged regularly or irregularly.

Figure 3:
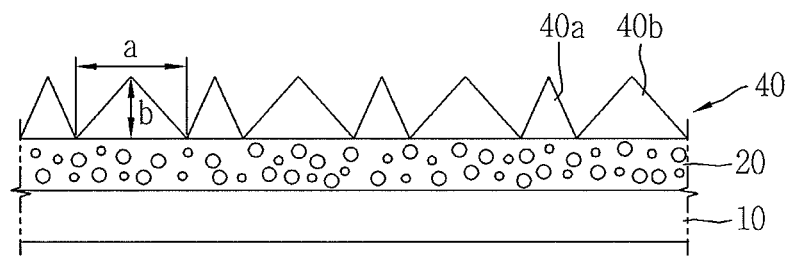
FIG. 3 is a cross-sectional view illustrating an optical sheet according to a second embodiment of the present invention.

An example thereof is illustrated in FIG. 3.

FIG. 3 shows an optical sheet including a prism layer 40 having a structured surface by arranging a plurality of 3D column structures, the cross-section of which is triangular. In the prism layer 40, two types of 3D structures 40a, 40b, having the same width a and different heights b, are regularly arranged.

In FIG. 3, only the case where the two types of 3D column structures, the cross-section of which is triangular, are regularly arranged is illustrated. However, without limitation thereto, the cross-section thereof may have a semicircular shape, a semi-elliptical shape, or a polygonal shape, and also, other types having the same height and different widths may coexist, and may be regularly or irregularly arranged.

In addition, the surface of a prism layer according to a third embodiment may be structured by arranging a plurality of 3D structures selected from among 3D column structures having a semicircular or semi-elliptical cross-section and 3D column structures having a triangular or polygonal cross-section, in which the arrangement of the 3D structures may be nonlinear when viewed from above.

Figure 4:
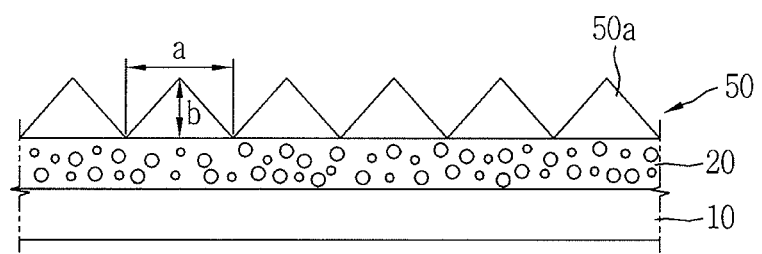
FIG. 4 is a cross-sectional view and a perspective view illustrating an optical sheet according to a third embodiment of the present invention.
Figure 4:
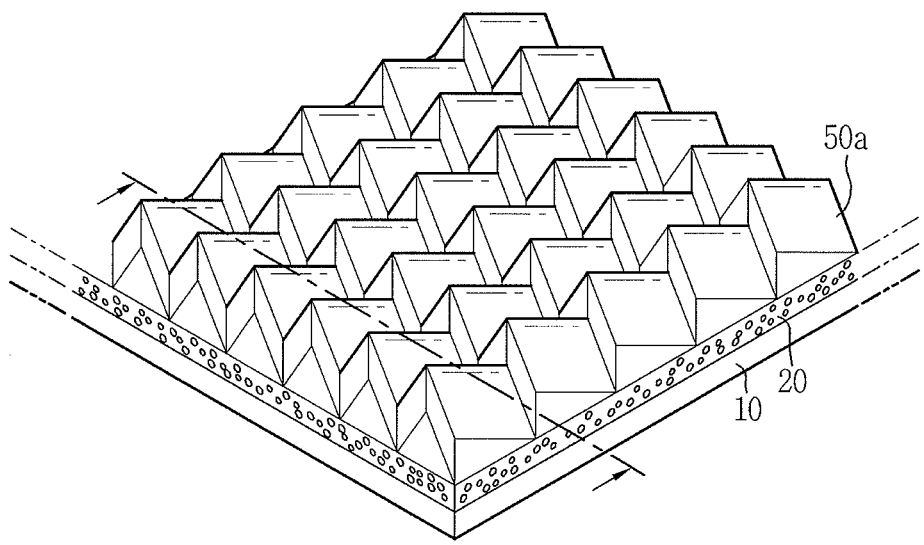

An example thereof is illustrated in FIG. 4. FIG. 4 shows a prism layer 50, in which 3D structures having a triangular cross-section are arranged in a zigzag form when viewed from above.

In FIG. 4, only the case where the 3D column structures 50a having a triangular cross-section are arranged in a zigzag form is illustrated. However, without limitation thereto, the cross-section thereof may have a semicircular shape, a semi-elliptical shape, or a polygonal shape, and further, the arrangement thereof may have an S form, which is also nonlinear, as an alternative to the zigzag form.

In addition, the surface of a prism layer according to a fourth embodiment may be structured by arranging a plurality of 3D structures selected from among circular cone structures and polypyramid structures. Such 3D structures having the same shape and dimension are continuously arranged to be adjacent to each other, in which imaginary lines that link the peaks of the respective 3D structures may be in a nonlinear form when viewed from above.

Figure 5:
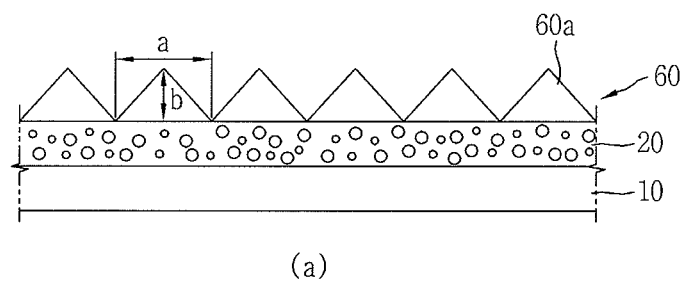
FIG. 5 is a cross-sectional view and a perspective view illustrating an optical sheet according to a fourth embodiment of the present invention.
Figure 5:
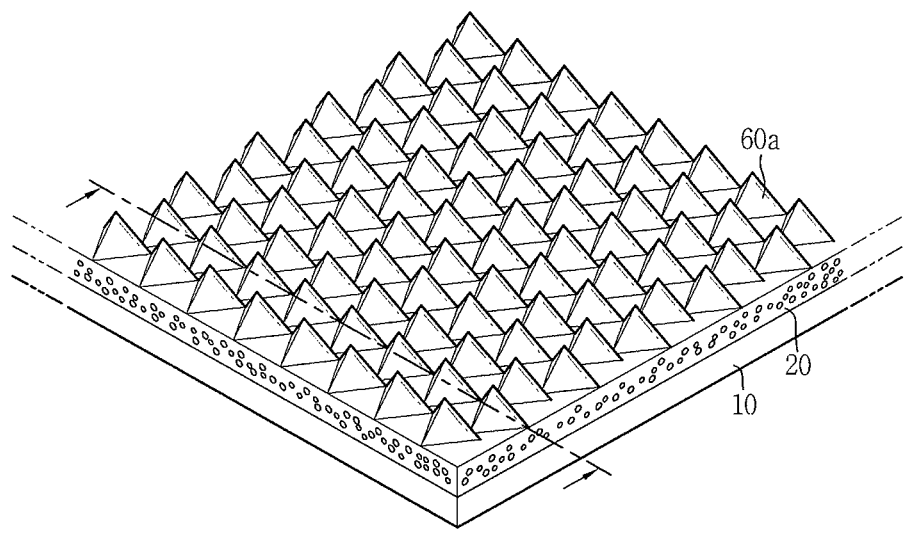

An example thereof is illustrated in FIG. 5. FIG. 5 shows the case where 3D structures 60a having a triangular pyramid shape are arranged to be adjacent to each other, in which imaginary lines that link the peaks of the respective triangular pyramids are in a zigzag form.

In FIG. 5, only the case where the 3D structures have a triangular pyramid shape are arranged in a zigzag form is illustrated. However, without limitation thereto, the 3D structures may have a circular cone shape or a polypyramid shape, and may be arranged in an S form, which is also nonlinear, as an alternative to the zigzag form.

According to the present invention, when the prism layer is formed to have a refractive index which is only 0.01~0.2 higher than that of the binder resin of the light diffusion layer, the total amount of light that is reflected may be decreased, advantageously reducing the loss of light.

Typically, when the refractive index of the prism layer is higher, the angle at which light is emitted is narrowed in the forward direction, and thus front-surface brightness may be increased, but the total amount of light that is reflected is increased, undesirably increasing the loss of light.

Figure 6:
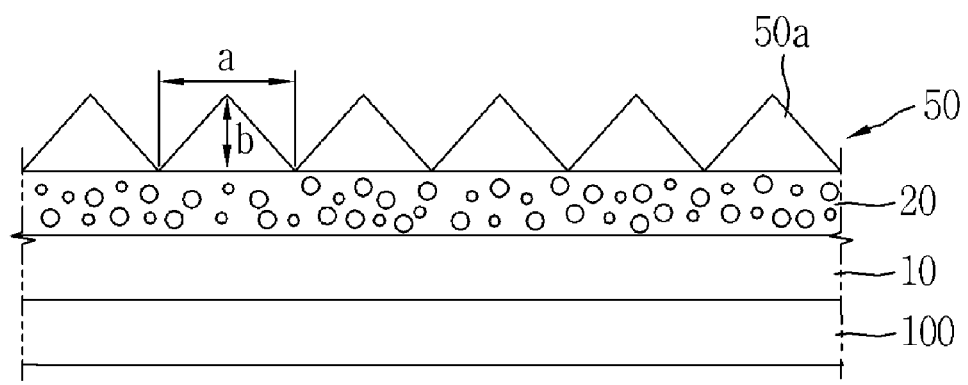
FIG. 6 is a cross-sectional view illustrating an optical sheet according to another embodiment of the present invention.

Meanwhile, as shown in FIG. 6, on the other surface of the transparent substrate layer (10), that is, on the surface of the transparent substrate layer opposite the surface having the light diffusion layer (20), a damage prevention layer (100) may be further formed. The damage prevention layer (100) is formed by dispersing particles in a binder resin. To this end, used is a resin that adheres well to the transparent substrate layer and has good compatibility with particles dispersed therein, that is, a resin in which particles are uniformly dispersed so that they are not separated or precipitated, and specific examples thereof may be the same as the binder resin of the light diffusion layer. The particles contained in the damage prevention layer include organic particles or inorganic particles, and examples thereof may be the same as or different from the light-diffusing particles contained in the light diffusion layer.

When the damage prevention layer contains the particles in an amount of 0.01~30 parts by weight based on 100 parts by weight of the binder resin, damage prevention effects are exhibited as desired. If the particles are used in an excessive amount, in the case of organic particles, front-surface brightness may be decreased due to the diffusion of light, and also, in the case of inorganic particles, light may be reflected from the surface of particles or absorbed thereon to thus decrease front-surface brightness, undesirably resulting in reduced efficiency of use of light. Accordingly, excessive use of the particles is undesirable.

The surface protrusions of the damage prevention layer, formed by the particles dispersed in the binder resin, function to reduce the contact area with the facing surface in the process device, or with another optical film, which is disposed thereon, during the loading or storage of optical films or the assembly of the optical films with other parts, thereby preventing surface damage, which may be caused by separation into respective films, transport or assembly.

In the optical sheet thus manufactured, light is primarily diffused while passing through the particles of the damage prevention layer, and is then uniformly diffused by the light-diffusing particles of the light diffusion layer through the transparent substrate layer, followed by passing such diffused light through the prism layer. In particular, the difference in refractive index between the light-diffusing particles and the binder resin in the light diffusion layer is decreased, thus reducing the internal reflection of light, thereby further increasing the efficiency of use of light. Hence, the amount of light that is lost is drastically decreased compared to previously, and also, films, which are conventionally separately manufactured and layered to impart a light diffusion function and a function of increasing brightness, may be manufactured in an integrated form, thus decreasing the manufacturing process and cost. Moreover, the optical sheet of the present invention is favorable because the number of films to be provided in an optical sheet assembly for a backlight unit may be decreased.

In addition, according to an exemplary embodiment of the present invention, a backlight unit assembly comprising the optical sheet as above and a light diffusion film or a prism film formed on any one surface thereof may be provided, thereby further increasing brightness compared to when using only the optical composite sheet. Further, even when a prism layer is provided as the uppermost layer without the use of a protective film, good visibility may be realized.

According to another exemplary embodiment of the present invention, a backlight unit assembly comprising the optical sheet as above and a protective film formed on any one surface thereof may be provided, thereby realizing brightness equal to when layering the light diffusion film, the prism film and the protective film and further increasing visibility.

Therefore, in the case where the optical sheet according to the preferred embodiments of the present invention is applied to the backlight unit, the optical sheet is advantageous because the degree of improvement of brightness relative to the number of sheets to be mounted is high and the difference in refractive index between the light-diffusing particles and the binder resin in the light diffusion layer is controlled to 0.05 or less, thus realizing a backlight unit assembly having a wide viewing angle.

MODE FOR INVENTION

A better understanding of the present invention may be obtained through the following examples, which are set forth to illustrate, but are not to be construed as the limit of the present invention.

In the following examples, a refractive index was measured using an ABBE refractometer (available from ATAGO). Typically, among ABBE refractometers, model number 1T is suitable for measurement of a sample in a refractive index range from 1.300 to 1.700, and model number 4T is suitable for measurement of a sample in a refractive index range from 1.470 to 1.870. The measurement was typically conducted at room temperature (25° C.)

Example 1

100 parts by weight of acrylic resin (52-666, Aekyung Chemical) was diluted with 70 parts by weight of methylethylketone and 50 parts by weight of toluene, thus preparing a binder resin having a refractive index of 1.50, after which spherical polymethylmethacrylate particles (MH20F, Kolon) having an average particle size of 20 μm and a refractive index of 1.50 were mixed in an amount of 110 parts by weight based on the binder resin, monodispersed in the form of a mono layer using a milling machine, applied on one surface of a super-transparent polyethyleneterephthalate film (FHSS, Kolon) 188 μm thick as a transparent substrate layer using a gravure coater, and then cured at 120° C. for 60 sec, thus forming a light diffusion layer (refractive index: 1.50) having a dry thickness of 25 μm.

Further, on one surface of the cured light diffusion layer, a photosensitive composition comprising 75 parts by weight of urethane acrylate, 20 parts by weight of 2-phenylethyl methacrylate, 3 parts by weight of 1,6-hexanediol acrylate, and 2 parts by weight of a BAPO-based photoinitiator was applied, and the frame of a prism-shaped roller was coated with the photosensitive composition applied on the light diffusion layer, after which UV light (Fusion, 300 watts/inch$^2$) was radiated onto the outer surface of the transparent substrate layer, thus forming a prism layer having linear triangular prisms and a refractive index of 1.53.

Example 2

An optical composite film was manufactured in the same manner as in Example 1, with the exception that a prism layer having nonlinear triangular prisms and a refractive index of 1.53 was formed on one surface of the light diffusion layer.

Example 3

An optical composite film was manufactured in the same manner as in Example 1, with the exception that the light-diffusing particles were dispersed in a multilayer form in the course of formation of the light diffusion layer. As such, the light diffusion layer was 30~35 μm thick and had a refractive index of 1.50.

Example 4

An optical composite film was manufactured in the same manner as in Example 2, with the exception that the light-diffusing particles were dispersed in a multilayer form in the course of formation of the light diffusion layer. As such, the light diffusion layer was 30~35 μm thick and had a refractive index of 1.50.

Example 5

An optical sheet was manufactured in the same manner as in Example 2, with the exception that, in the course of formation of the light diffusion layer, particles having a refractive index of 1.52 were used instead of the spherical polymethylmethacrylate particles having an average particle size of 20 μm and a refractive index of 1.50.

Example 6

An optical sheet was manufactured in the same manner as in Example 2, with the exception that, in the course of formation of the light diffusion layer, particles having a refractive index of 1.55 were used instead of the spherical polymethylmethacrylate particles having an average particle size of 20 μm and a refractive index of 1.50.

Example 7

An optical sheet was manufactured in the same manner as in Example 1, with the exception that a prism layer having a refractive index of 1.6 was formed.

Example 8

An optical sheet was manufactured in the same manner as in Example 2, with the exception that, in the course of formation of the light diffusion layer, particles having an average particle size of 5 μm were used.

Example 9

A light diffusion film (LD602, Kolon) was disposed on the outer surface of the transparent substrate layer of the optical sheet of Example 2.

Example 10

A protective film (LD143, Kolon) was disposed on the outer surface of the prism layer of the optical composite film of Example 2.

Comparative Example 1

A light diffusion film (LD602, Kolon) was prepared.

Comparative Example 2

A prism film (LC213, Kolon) was prepared.

Comparative Example 3

The prism film of Comparative Example 2 was disposed on the light diffusion film of Comparative Example 1.

Comparative Example 4

On a protective film (LD143, Kolon), the light diffusion film of Comparative Example 1 and the prism film of Comparative Example 2 were sequentially disposed.

Comparative Example 5

An optical sheet was manufactured in the same manner as in Example 2, with the exception that, in the course of formation of the light diffusion layer, particles having a refractive index of 1.6 were used instead of the spherical polymethylmethacrylate particles having a particle size of 20 μm and a refractive index of 1.50.

Comparative Example 6

A light diffusion film (LD602, Kolon) was disposed on the outer surface of the transparent substrate layer of the optical sheet of Comparative Example 5.

The properties of the optical films of the above examples and comparative examples were evaluated as follows. The evaluation results are shown in Table 1 below.

<Brightness>

One or two of the optical films of the above examples and comparative examples were mounted to a backlight unit for 17" LCD panels, and the brightness values of optionally points were measured using a luminance meter (model number: BM-7, Topcon, Japan), averaged, and then evaluated according to the following:

⊚: brightness of 4500 cd/m$^2$ or more
○: brightness between 3500 cd/m$^2$ and less than 4500 cd/m$^2$
Δ: brightness between 3000 cd/m$^2$ and less than 3500 cd/m$^2$
X: brightness less than 3000 cd/m$^2$ <Viewing Angle>

Each of the optical films of the above examples and comparative examples was mounted to a backlight unit for 17" LCD panels, and brightness was measured at intervals of 10° in the range of 80° toward each of both sides from the center line perpendicular to the unit, using a luminance meter (model number: BM-7, Topcon, Japan), and the angle at which brightness was half the maximum brightness was determined.

<Visibility>

Each of the optical films of the above examples and comparative examples was mounted to a backlight unit for 17" LCD panels, and the mounted surface was observed with the naked eye and then evaluated according to the following:

X: the case where the entire surface is not uniform and a rainbow due to pattern interference was visible
○: the case where the entire surface is uniform and a rainbow due to pattern interference was not observed

TABLE 1

|  | Brightness | Viewing Angle (°) | Visibility |
| --- | --- | --- | --- |
| Ex. 1 | ○ | ±55 | ○ |
| Ex. 2 | ○ | ±55 | ○ |
| Ex. 3 | ○ | ±55 | ○ |
| Ex. 4 | ○ | ±55 | ○ |
| Ex. 5 | ○ | ±55 | ○ |
| Ex. 6 | ○ | ±55 | ○ |
| Ex. 7 | ○ | ±54 | ○ |
| Ex. 8 | ○ | ±55 | ○ |
| Ex. 9 | ⊚ | ±48 | ○ |
| Ex. 10 | ○ | ±53 | ○ |
| C. Ex. 1 | Δ | ±65 | ○ |
| C. Ex. 2 | ○ | ±55 | X |
| C. Ex. 3 | ⊚ | ±47 | X |
| C. Ex. 4 | ⊚ | ±44 | ○ |
| C. Ex. 5 | Δ | ±51 | ○ |
| C. Ex. 6 | ○ | ±43 | ○ |

As is apparent from the above evaluation results, the brightness and viewing angle in the examples were higher. The optical sheets of the examples could be seen to have superior visibility.

Further, in the case where the refractive index of the prism layer was about 0.01~0.2 higher than that of the binder resin of the light diffusion layer, much better results were exhibited.

In the optical sheets of the examples, the viewing angle was wider than in the case of Comparative Example 3, in which the light diffusion film and the prism film were disposed thereon.

In Comparative Example 5, in which the difference in refractive index between the light-diffusing particles and the binder resin was greater than 0.05 despite the composite film, the brightness and viewing angle were lower than in the examples.

Thus, the optical composite sheets according to the examples could be confirmed to increase the efficiency of use of a light source while minimizing the loss of light. Compared to the conventional case, in which all of the light diffusion film, the prism film, and the protective film were separately mounted, the number of sheets was decreased but the brightness was equal thereto, and also, the viewing angle and visibility were superior.

Example 11

100 parts by weight of acrylic resin (52-666, Aekyung Chemical) was diluted with 100 parts by weight of methylethylketone and 100 parts by weight of toluene, thus preparing a binder resin having a refractive index of 1.5, after which spherical polymethylmethacrylate particles (MH20F, Kolon) having an average particle size of 20 μm and a refractive index of 1.50 were mixed in an amount of 130 parts by weight based on the binder resin, and were then dispersed using a milling machine.

Then, the particles thus dispersed were applied on one surface of a super-transparent polyethylene terephthalate film (FHSS, Kolon) 125 μm thick as a transparent substrate layer using a gravure coater, and were then cured at 120° C. for 60 sec, thus forming a light diffusion layer having a dry thickness of 23 μm. In this case, the particles of the light diffusion layer were dispersed in the form of a mono layer.

Further, 100 parts by weight of acrylic resin (52-666, Aekyung Chemical) was diluted with 200 parts by weight of methylethylketone and 150 parts by weight of toluene, thus preparing a binder resin, after which spherical polymethylmethacrylate particles (MH10F, Kolon) having an average particle size of 11.5 μm were mixed in an amount of 20 parts by weight based on the binder resin, dispersed using a milling machine, applied on the other surface of the transparent substrate layer, and then cured at 120° C. for 60 sec, thus forming a damage prevention layer having a dry thickness of 1~3 μm.

Furthermore, one surface of the cured light diffusion layer was coated with a photosensitive composition comprising 80 parts by weight of high-refractive acrylate, 15 parts by weight of 2-phenylethyl methacrylate, 3 parts by weight of 1,6-hexanediol acrylate, and 2 parts by weight of a BAPO-based photoinitiator, after which UV light (Fusion, 300 watts/inch$^2$) was radiated onto the transparent substrate layer, thus forming a prism layer having linear triangular prisms (with a column shape having a right isosceles triangle cross-section having a width of 50 μm and a height of 25 μm). The refractive index of the prism layer was 1.53.

Example 12

An optical sheet was manufactured in the same manner as in Example 11, with the exception that, in the course of formation of the light diffusion layer, particles having a refractive index of 1.52 were used instead of the spherical polymethylmethacrylate particles having a particle size of 20 μm and a refractive index of 1.50.

Example 13

An optical sheet was manufactured in the same manner as in Example 11, with the exception that, in the course of formation of the light diffusion layer, particles having a refractive index of 1.54 were used instead of the spherical polymethylmethacrylate particles having a particle size of 20 μm and a refractive index of 1.50.

Example 14

An optical sheet was manufactured in the same manner as in Example 11, with the exception that a prism layer having a refractive index of 1.6 was formed.

Example 15

An optical sheet was manufactured in the same manner as in Example 11, with the exception that, in the course of formation of the light diffusion layer, particles having a particle size of 5 μm were used instead of the spherical polymethylmethacrylate particles having a particle size of 20 μm and a refractive index of 1.50.

Example 16

An optical sheet was manufactured in the same manner as in Example 11, with the exception that the prism layer was formed such that first pitches (30a of FIG. 2), having a width of 50 μm and a height of 25 μm, and second pitches (30b of FIG. 2), having a width of 50 μm and a height of 23 μm, were alternately arranged, as shown in FIG. 2.

Example 17

An optical sheet was manufactured in the same manner as in Example 11, with the exception that the prism layer was formed such that first pitches (30a of FIG. 2), having a width of 50 μm and a height of 25 μm, and second pitches, (30b of FIG. 2) having a width of 45 μm and a height of 25 μm, were alternately arranged, as shown in FIG. 3.

Example 18

An optical sheet was manufactured in the same manner as in Example 1, with the exception that the prism layer was formed such that pitches having a width of 50 μm and a height of 25 μm were arranged in a zigzag form when viewed from above, as shown in FIG. 4.

Comparative Example 7

(1) 100 parts by weight of acrylic resin (52-666, Aekyung Chemical) was diluted with 100 parts by weight of methylethylketone and 100 parts by weight of toluene, after which spherical polymethylmethacrylate particles (MH20F, Kolon) having an average particle size of 18.1 μm, were mixed in an amount of 130 parts by weight based on the acrylic resin, dispersed using a milling machine, and then applied on one surface of a super-transparent polyethylene terephthalate film (FHSS, Kolon) 125 μm thick using a gravure coater, thus forming a light diffusion layer having a dry thickness of 20 μm, thereby manufacturing an optical film.

(2) Separately, on the other surface of a super-transparent polyethyleneterephthalate film (FHSS, Kolon) as a plastic substrate, a photosensitive composition comprising 80 parts by weight of high-refractive acrylate, 15 parts by weight of 2-phenylethyl methacrylate, 3 parts by weight of 1,6-hexanediol acrylate, and 2 parts by weight of a BAPO-based photoinitiator was applied, after which UV light (Fusion, 300 watts/inch$^2$) was radiated onto the transparent substrate layer, thus forming linear triangular prisms, thereby manufacturing an optical film.

Then, the optical film having the linear triangular prisms was disposed on the optical film having the light diffusion layer thereon.

The properties of the optical films of the above examples and comparative examples were evaluated as follows. The evaluation results are shown in Table 2 below.

<Brightness (Cd/m$^2$)>

One or two of the optical films of the above examples and comparative examples were mounted to a backlight unit for 24" LCD panels, and the brightness values of optionally points were measured using a luminance meter (model number: BM-7, Topcon, Japan), and then averaged.

<Viewing Angle>

Each of the optical films of the above examples and comparative examples was mounted to a backlight unit for 24" LCD panels, and brightness was measured at intervals of 10° in the range of 80° toward each of both sides from the center line perpendicular to the unit, using a luminance meter (model number: BM-7, Topcon, Japan), and the angle at which brightness was half the maximum brightness was determined.

<Light Interference>

Two of the optical films of the above examples or comparative examples were interposed between glass plates, after which pressure was applied to the glass plates and thus light interference (Newton's Ring) occurring from the films due to excessive adhesion was observed. The relative degree of light interference was evaluated as below:

Newton's Ring: No Generation ←◎ -○-Δ-X→Generation

TABLE 2

| | Brightness (Cd/m$^2$) | Viewing Angle (°) | Light Interference |
|---|---|---|---|
| Ex. 11 | 11615 | ±55 | ○ |
| Ex. 12 | 11590 | ±55 | ○ |
| Ex. 13 | 11576 | ±55 | ○ |
| Ex. 14 | 12100 | ±55 | ○ |
| Ex. 15 | 10750 | +55 | ○ |
| Ex. 16 | 11345 | ±54 | ◎ |
| Ex. 17 | 11320 | +54 | ◎ |
| Ex. 18 | 11410 | ±54 | ◎ |
| C. Ex. 7 | 12480 | ±45 | Δ |

As is apparent from the above results, as in Examples 11 to 18, in the case where the difference in refractive index between the resin and the particles in the light diffusion layer was in the range of 0.05 or less, brightness was seen to be higher despite the composite film. In particular, as in Examples 11 to 18, when the light-diffusing particles were dispersed in a mono layer and the prism layer had a refractive index about 0.01~0.2 higher than that of the binder resin of the light diffusion layer, much better results were obtained.

In the case of the optical composite sheets of Examples 11 to 18, the viewing angle was wider than the case in which the diffusion film and the prism film were disposed thereon.

As in Examples 16 to 18, in the case where the pattern of the prism layer was nonlinear, light interference could be seen to be decreased compared to the optical sheet of Example 1.

Thereby, when a display panel is mounted thereon, light interference and contact surface with the upper panel can be more advantageously reduced compared to the linear pattern.

The invention claimed is:

1. An optical sheet disposed on a light source to constitute a backlight unit assembly, comprising:
   a transparent substrate layer;
   a light diffusion layer formed on one surface of the transparent substrate layer and containing a binder resin and light-diffusing particles, in which a difference in refractive index between the light-diffusing particles and the binder resin is 0.05 or less; and
   a prism layer formed on the light diffusion layer, said prism layer having a refractive index which is 0.01-0.2 higher than the refractive index of the binder resin of the light diffusion layer,
   wherein the transparent substrate layer, the light diffusion layer, and the prism layer are disposed in this order from an incident plane of the light source.

2. The optical sheet according to claim 1, further comprising a damage prevention layer formed on the other surface of the transparent substrate layer, the other surface of the transparent substrate layer being opposite to the surface of the transparent substrate layer where the light diffusion layer is formed, wherein the damage prevention layer comprises a binder resin and particles.

3. The optical sheet according to claim 1, wherein the light diffusion layer has a cross-sectional structure in which the light-diffusing particles are dispersed in a mono layer.

4. The optical sheet according to claim 1, wherein the light diffusion layer comprises light-diffusing particles having a particle size of 1-50 μm.

5. The optical sheet according to claim 1, wherein the light diffusion layer comprises 10-500 parts by weight of the light-diffusing particles based on 100 parts by weight of a solid content of the binder resin.

6. The optical sheet according to claim 1, wherein the light diffusion layer comprises 10-300 parts by weight of the light-diffusing particles based on 100 parts by weight of a solid content of the binder resin.

7. The optical sheet according to claim 1, wherein the prism layer is imparted with a structured surface by arranging a plurality of three-dimensional structures selected from the groups consisting of three-dimensional column structures having a semicircular cross-section, three-dimensional column structures having a semi-elliptical cross-section, three-dimensional column structures having a triangular cross-section, three-dimensional column structures having a polygonal cross-section, circular cone structures, and polypyramid structures.

8. The optical sheet according to claim 1, wherein the prism layer is imparted with a structured surface by arranging a plurality of three-dimensional structures selected from the group consisting of three-dimensional column structures having a semicircular cross-section, three-dimensional column structures having a semi-elliptical cross-section, three-dimensional column structures having a triangular cross-section, three-dimensional column structures having a polygonal cross-section, circular cone structures, and polypyramid structures, wherein the three-dimensional structures comprise at least two types of three-dimensional structures having a same width and different heights, which are arranged regularly or irregularly.

9. The optical sheet according to claim 1, wherein the prism layer is imparted with a structured surface by arranging a plurality of three-dimensional structures selected from the group consisting of three-dimensional column structures having a semicircular or cross-section, three-dimensional column structures having a semi-elliptical cross-section, three-dimensional column structures having a triangular cross-section, three-dimensional column structures having a polygonal cross-section, circular cone structures, and polypyramid structures, wherein the three-dimensional structures comprise at least two types of three-dimensional structures having different widths and a same height, which are arranged regularly or irregularly.

10. The optical sheet according to claim 1, wherein the prism layer is imparted with a structured surface by arranging a plurality of three-dimensional structures selected from the group consisting of three-dimensional column structures having a semicircular cross-section, three-dimensional column structures having a semi-elliptical cross-section, three-dimensional column structures having a triangular cross-section, and three-dimensional column structures having a polygonal cross-section, wherein an arrangement of the three-dimensional structures is in a nonlinear form when viewed from top of the structures.

11. The optical sheet according to claim 1, wherein the prism layer is imparted with a structured surface by arranging a plurality of three-dimensional structures selected from the group consisting of circular cone structures and polypyramid structures, wherein the three-dimensional structures having a same shape and a same dimension are continuously arranged to be adjacent to each other, in which imaginary lines that link peaks of the three-dimensional structures are in a nonlinear form when viewed from top of the structures.

12. The optical sheet according to claim 2, wherein the damage prevention layer comprises particles which are same as or different from the particles of the light diffusion layer.

13. A backlight unit assembly, comprising:
   a light source;
   an optical sheet; and
   a light diffusion sheet,
   wherein the optical sheet comprises
      a transparent substrate layer,
      a light diffusion layer formed on one surface of the transparent substrate layer and containing a binder resin and spherical light-diffusing organic particles, said binder resin and said spherical light-diffusing organic particles both being optically isotropic, in which a difference in refractive index between the spherical light-diffusing organic particles and the binder resin is 0.05 or less, and
      a prism layer formed on the light diffusion layer, said prism layer having a refractive index which is 0.01-0.2 higher than the refractive index of the binder resin of the light diffusion layer;
   wherein the transparent substrate layer, the light diffusion layer, and the prism layer are disposed in this order from an incident plane of the light source, and
   wherein the light diffusion sheet is disposed on the prism layer of the optical sheet or on the transparent substrate layer of the optical sheet.

14. A backlight unit assembly, comprising:
   a light source;
   an optical sheet; and
   a prism sheet,
   wherein the optical sheet comprises
      a transparent substrate layer,
      a light diffusion layer formed on one surface of the transparent substrate layer and containing a binder resin and spherical light-diffusing organic particles, said binder resin and said spherical light-diffusing organic particles both being optically isotropic, in which a difference in refractive index between the spherical light-diffusing organic particles and the binder resin is 0.05 or less, and a prism layer formed on the light diffusion layer, which has a refractive index which is 0.01-0.2 higher than the refractive index of the binder resin of the light diffusion layer;

wherein the transparent substrate layer, the light diffusion layer, and the prism layer are disposed in this order from an incident plane of the light source, and wherein the prism sheet is disposed on the prism layer of the optical sheet or on the transparent substrate layer of the optical sheet.

15. A backlight unit assembly, comprising:
a light source;
an optical sheet; and
a protective film,
wherein the optical sheet comprises
a transparent substrate layer,
a light diffusion layer formed on one surface of the transparent substrate layer, said light diffusion layer containing a binder resin and spherical light-diffusing organic particles, said binder resin and said spherical light-diffusing organic particles both being optically isotropic, in which a difference in refractive index between the spherical light-diffusing organic particles and the binder resin is 0.05 or less, and a prism layer formed on the light diffusion layer, which has a refractive index which is 0.01-0.2 higher than the refractive index of the binder resin of the light diffusion layer;

wherein the transparent substrate layer, the light diffusion layer, and the prism layer are disposed in this order from an incident plane of the light source, and wherein the protective film is disposed on the prism layer of the optical sheet or on the transparent substrate layer of the optical sheet.

16. The optical sheet according to claim 3, wherein the light diffusion layer comprises light-diffusing particles having a particle size of 1-50 μm.

17. The optical sheet according to claim 3, wherein the light diffusion layer comprises 10-500 parts by weight of the light-diffusing particles based on 100 parts by weight of a solid content of the binder resin.

18. The optical sheet according to claim 3, wherein the light diffusion layer comprises 10-300 parts by weight of the light-diffusing particles based on 100 parts by weight of a solid content of the binder resin.

* * * * *